(12) United States Patent
Natham et al.

(10) Patent No.: US 10,587,481 B2
(45) Date of Patent: *Mar. 10, 2020

(54) DIRECTING DATA FLOWS IN DATA CENTERS WITH CLUSTERING SERVICES

(71) Applicant: Cisco Technology, Inc., San Jose, CA (US)

(72) Inventors: Venkataraman Natham, Pleasanton, CA (US); Pagalavan Krishnamoorthy, San Jose, CA (US); Ramesh Santhanakrishnan, Fremont, CA (US); Ali Golshan, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/865,512

(22) Filed: Jan. 9, 2018

(65) Prior Publication Data

US 2018/0152357 A1    May 31, 2018

Related U.S. Application Data

(63) Continuation of application No. 14/022,049, filed on Sep. 9, 2013, now Pat. No. 9,917,743, which is a continuation of application No. 12/958,097, filed on Dec. 1, 2010, now Pat. No. 8,533,285.

(51) Int. Cl.
| | | |
|---|---|---|
| *G06F 15/173* | (2006.01) | |
| *H04L 12/24* | (2006.01) | |
| *H04L 12/721* | (2013.01) | |
| *H04L 29/08* | (2006.01) | |

(52) U.S. Cl.
CPC .............. *H04L 41/50* (2013.01); *H04L 45/66* (2013.01); *H04L 67/1002* (2013.01)

(58) Field of Classification Search
CPC ............. H04L 67/1002; H04L 67/1004; H04L 29/08153; H04L 67/1036; G06F 9/45533
USPC .................................................. 709/224, 226
See application file for complete search history.

(56) References Cited

U.S. PATENT DOCUMENTS

| | | |
|---|---|---|
| 6,590,861 B1 | 7/2003 | Vepa et al. |
| 6,725,253 B1 | 4/2004 | Okano et al. |
| 6,970,913 B1 | 11/2005 | Albert et al. |
| 7,003,575 B2 | 2/2006 | Ikonen |
| 7,328,237 B1* | 2/2008 | Thubert ............ H04L 29/12783 370/392 |
| 7,506,368 B1 | 3/2009 | Kersey et al. |
| 7,567,504 B2* | 7/2009 | Darling .................... H04L 29/06 370/216 |
| 7,650,427 B1* | 1/2010 | Liu ....................... G06Q 20/401 370/237 |
| 7,739,398 B1* | 6/2010 | Shabtay ................. H04L 47/125 370/389 |
| 7,877,511 B1 | 1/2011 | Berger et al. |
| 8,447,829 B1 | 5/2013 | Geller et al. |
| 8,788,570 B2 | 7/2014 | Goel |
| 9,942,162 B2* | 4/2018 | Golshan ................ H04L 47/283 |
| 2002/0038339 A1 | 3/2002 | Xu |

(Continued)

*Primary Examiner* — Phuoc H Nguyen
(74) *Attorney, Agent, or Firm* — Behmke Innovation Group LLC; James Behmke; Stephen D. LeBarron

(57) ABSTRACT

Techniques are provided for implementing clustering services in a virtual data center or other virtualized infrastructure in a manner that allows packets to be directed to a particular service engine of a service engine cluster.

20 Claims, 13 Drawing Sheets

(56) References Cited

U.S. PATENT DOCUMENTS

| | | | |
|---|---|---|---|
| 2002/0103846 A1* | 8/2002 | Zisapel | G06F 9/505 718/105 |
| 2002/0194342 A1 | 12/2002 | Lu et al. | |
| 2003/0195984 A1* | 10/2003 | Zisapel | G06F 9/505 709/238 |
| 2004/0260745 A1* | 12/2004 | Gage | H04L 29/12009 709/200 |
| 2006/0112170 A1* | 5/2006 | Sirkin | H04L 29/12066 709/217 |
| 2006/0155862 A1* | 7/2006 | Kathi | H04L 45/38 709/229 |
| 2007/0192863 A1 | 8/2007 | Kappor et al. | |
| 2008/0263205 A1* | 10/2008 | Naseh | H04L 29/12367 709/226 |
| 2009/0070775 A1 | 3/2009 | Riley | |
| 2010/0268764 A1* | 10/2010 | Wee | G06F 9/505 709/203 |
| 2010/0299366 A1 | 11/2010 | Stienhans et al. | |
| 2010/0322237 A1 | 12/2010 | Raja et al. | |
| 2012/0023558 A1 | 1/2012 | Rafiq | |
| 2012/0059934 A1* | 3/2012 | Rafiq | H04L 67/1008 709/225 |
| 2012/0066487 A1* | 3/2012 | Brown | G06F 9/5083 713/150 |
| 2012/0102163 A1* | 4/2012 | Witt | G06F 9/5077 709/221 |
| 2013/0117766 A1* | 5/2013 | Bax | G06F 9/4405 719/323 |

\* cited by examiner (3) Server1 sends reverse packet to Load Balancer

| Source IP address / Port number / MAC address | Destination IP address / Port number / MAC address |
|---|---|
| Server1 IP Address / 80 / Server1 MAC address | Client IP Address / 100 / Load Balancer MAC address |

(4) Load Balancer sends reverse packet to Client

| Source IP address / Port number / MAC address | Destination IP address / Port number / MAC address |
|---|---|
| Virtual Data Center IP Address / 80 / Load Balancer MAC address | Client IP Address / 100 / Router MAC address |

*FIG. 3*

(1) Client sends forward packet to data center

| Source IP address / Port number / MAC address | Destination IP address / Port number / MAC address |
|---|---|
| Client IP Address / 100 / Router MAC address | Virtual Data Center IP Address / 80 / Virtual Load Balancer MAC address |

(2) Selected Load Balancer sends forward packet to Server1

| Source IP address / Port number / MAC address | Destination IP address / Port number / MAC address |
|---|---|
| Client IP Address / 100 / Load-Balancer1 MAC address | Server1 IP Address / 80 / Server1 MAC address |

*FIG. 5*

(3) Server1 sends reverse packet to the Cluster of Load Balancers

| Source IP address / Port number / MAC address | Destination IP address / Port number / MAC address |
|---|---|
| Server1 IP Address / 80 / Server1 MAC address | Client IP Address / 100 / Virtual Load-Balancer MAC address |

(4) Flow Table Controller intercepts reverse packet and changes the Destination MAC address

| Source IP address / Port number / MAC address | Destination IP address / Port number / MAC address |
|---|---|
| Server1 IP Address / 80 / Server1 MAC address | Client IP Address / 100 / Load-Balancer1 MAC address |

(5) Load Balancer1 sends reverse packet to Client

| Source IP address / Port number / MAC address | Destination IP address / Port number / MAC address |
|---|---|
| Virtual Data Center IP Address / 80 / Virtual Load Balancer MAC address | Client IP Address / 100 / Router MAC address |

*FIG. 6*

PACKET HEADERS

| Source IP address / Port number / MAC address | Destination IP address / Port number / MAC address |
|---|---|
| Client1 IP Address / X / ACE1 MAC address | Server1 IP Address / 80 / Server1 MAC address |
| Client2 IP Address / Y / ACE1 MAC address | Server2 IP Address / 80 / Server1 MAC address |
| Client3 IP Address / Z / ACE2 MAC address | Server1 IP Address / 80 / Server1 MAC address |

910 → (row 1), 920 → (row 2), 930 → (row 3)

FLOW TABLE ENTRIES

| |
|---|
| If from Server1/80 to Client1/X, then Destination_MAC to ACE1_MAC |
| If from Server2/80 to Client2/Y, then Destination_MAC to ACE1_MAC |
| If from Server1/80 to Client3/Z, then Destination_MAC to ACE2_MAC |

940 → (row 1), 950 → (row 2), 960 → (row 3)

*FIG. 9*

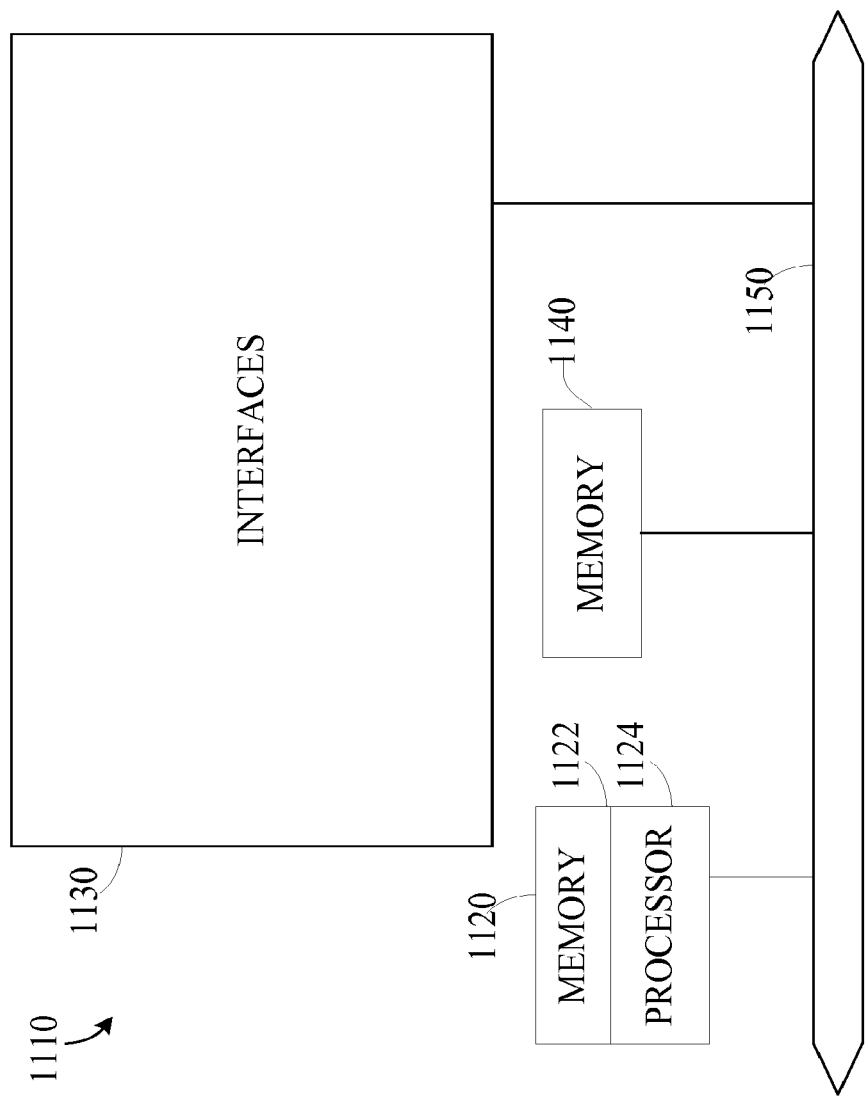

DIRECTING DATA FLOWS IN DATA CENTERS WITH CLUSTERING SERVICES

RELATED APPLICATION

This is a continuation application of U.S. patent application Ser. No. 14/022,049 filed on Sep. 9, 2013, entitled "Directing Data Flows in Data Centers with Clustering Services.", which is a continuation application of U.S. patent application Ser. No. 12/958,097 (now U.S. Pat. No. 8,533,285) filed on Dec. 1, 2010, entitled "Directing Data Flows in Data Centers with Clustering Services." The contents of which are incorporated herein by reference in its entirety and for all purposes.

TECHNICAL FIELD

The present invention relates to network technology and, more particularly, to improving clustering services.

DESCRIPTION OF RELATED ART

As virtualization has become an increasingly important aspect of network technology, various solutions have been proposed to provide virtualized environments that link different servers and/or other devices into unified systems. Such virtualized infrastructures can provide a platform for cloud computing, among other things.

Virtual data centers constitute one example of such virtualization technology. They provide the ability to pool computing resources in a dynamic manner with less need for management involvement. One technique that can be used to pool resources is clustering. A cluster can be used to represent multiple service engines, as one logical service entity. For example, a data center might use a plurality of load balancers to assign data traffic from clients across a group of servers. The plurality of load balancers can be represented as a single load balancing cluster visible as such to clients.

Clustering solutions pose challenges, however, particularly as cluster administering features become increasingly complex. For example, it is often important for a single service engine and/or server to process all packets associated with a given data flow. Additionally, it may be necessary to ensure that the particular packets trace appropriate paths through the various packet handling components within the cluster.

Conventional mechanisms for directing traffic in a network have significant limitations when it comes to directing traffic to a particular service engine of a service engine cluster. Consequently, it is desirable to provide improved techniques and mechanisms for directing traffic to a particular service engine of a service engine cluster.

BRIEF DESCRIPTION OF THE DRAWINGS

The disclosure may best be understood by reference to the following description taken in conjunction with the accompanying drawings, which illustrate particular example embodiments.

FIG. 3 illustrates a particular example of portions of packet headers that might be used in connection with the data center depicted in FIG. 1.

FIG. 5 illustrates a particular example of portions of packet headers that might be used in connection with the data center depicted in FIG. 4.

FIG. 6 illustrates a particular example of portions of packet headers that might be used in connection with the data center depicted in FIG. 4.

FIG. 11 illustrates a particular example of a data center switch.

DESCRIPTION OF PARTICULAR EMBODIMENTS

Figure 1:
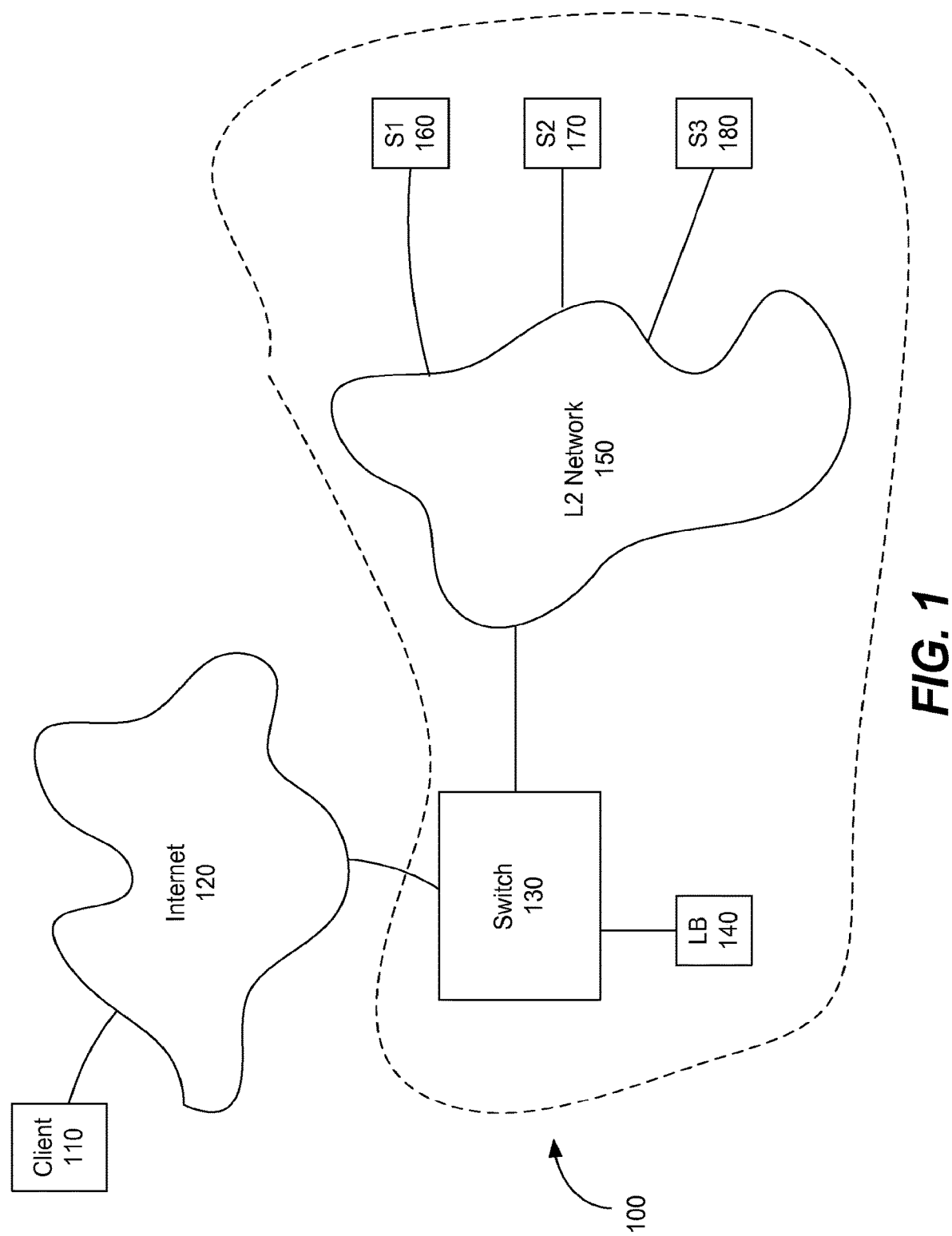
FIG. 1 illustrates a particular example of a data center.

Reference will now be made in detail to some specific examples of the invention including the best modes contemplated by the inventors for carrying out the disclosed embodiments. Examples of these specific embodiments are illustrated in the accompanying drawings. While some embodiments of the invention are described in conjunction with these drawings, it will be understood that they are not intended to limit the invention to the described embodiments. On the contrary, the application is intended to cover alternatives, modifications, and equivalents as may be included within the spirit and scope of the disclosed embodiments.

For example, the techniques of some embodiments will be described in the context of particular virtual data center configurations. However, it should be noted that the techniques of the disclosed embodiments apply to a variety of different virtualization configurations.

Various techniques and mechanisms of the disclosed embodiments will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. When a single device or article is described, it will be readily apparent that more than one device/article (whether or not they cooperate) may be used in place of a single device/article. Furthermore, the techniques and mechanisms of various embodiments will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

In the following description, numerous specific details are set forth in order to provide a thorough understanding of the disclosed embodiments. It will be understood, however, that alternatives of the disclosed embodiments may be practiced without some or all of these specific details. In other instances, well-known process steps have not been described in detail in order not to unnecessarily obscure the disclosed embodiments.

OVERVIEW

Techniques are provided for directing traffic to a particular service engine of a service engine cluster. In one embodiment, a forward packet originating from a client is received. A first service engine from among a group of available service engines is identified, wherein the first service engine controls a network connection with the client. A first server from among a group of servers is identified by the first service engine to act on the forward packet. An entry in a flow table is created, which entry relates the first service engine, the first server and the client. A reverse packet originating from the first server is received. It is determined that the reverse packet originated from the first server and is destined for the client. A MAC address of the first service engine is applied to the reverse packet.

Another embodiment provides a computer readable storage medium having computer program instructions stored thereon for performing the following operations: receiving a forward packet originating from a client; identifying a first service engine from among a group of service engines, wherein the first service engine controls a network connection with the client; identifying, by the first service engine, a first server from among a group of servers to act on the forward packet; creating an entry in a flow table, which entry relates the first service engine, the first server and the client; receiving a reverse packet; determining that the reverse packet originated from the first server and is destined for the client; and applying a MAC address of the first service engine to the reverse packet.

Another embodiment provides an apparatus, comprising: a plurality of interfaces configured to receive packets; one or more processors and associated memory configured to identify a first service engine, from among a group of available service engines, upon receiving a forward packet originating from a client, wherein the first service engine controls a network connection with the client, and wherein the forward packet was generated as part of the connection; identify, by the first service engine, a first server from among a group of servers to act on the forward packet; create an entry in a flow table, which entry relates the first service engine, the first server and the client; determine that a reverse packet originating from the first server and destined for the client originated from the first server and is destined for the client; and apply a MAC address of the first service engine to the reverse packet.

In another embodiment, a forward packet is received from a client. A classification for the forward packet is determined. If the determined classification indicates that the forward packet is one for which it is desirable that any reverse traffic be processed by same service engine that processed the forward packet, an entry is created in a flow table, which flow table entry identifies a first service engine, the client, and a destination of the forward packet. A reverse packet is received. The flow table entry is located. The header of the reverse packet is rewritten to identify the first service engine.

SPECIFIC EXAMPLE EMBODIMENTS

Virtualization techniques such as clustering provide an important mechanism for flexibly and dynamically configuring resources for performing applications or storing data, among other things.

As noted above, a cluster can be used to represent multiple service engines as a single virtual service entity. A cluster may be assigned one or more virtual identifiers (for example, in a TCP/IP network, a virtual MAC address and a virtual IP address) to use in communicating with other devices on a network. Individual devices of a cluster may also have their own physical device MAC addresses, but these addresses may seldom be used in communications with entities outside the cluster.

However, in certain situations it can be desirable that other entities be able to communicate directly with a particular service engine of a cluster of service engines. This may occur, for example, when a service engines, such as a load balancer or a firewall, processes a packet that is part of a larger data flow. For example, a client may send a packet which triggers multiple messages between the client and a server, the messages relaying application information and/or establishing and maintaining a network connection, for example. Such messages can constitute a data flow. In some circumstances, it may be desirable for a service engine (e.g., a load balancer) in the path of the data flow to maintain state information concerning the data flow. In such a situation, it can be advantageous for all packets of a data flow to be processed by the same service engine.

Thus, if instead of one load balancer, the data center uses a cluster of load balancers, it may be desirable to have all traffic relating to a particular data flow pass through and be processed by the same load balancer, instead of being randomly processed by different load balancers of the group. This result may be desired, for example, as noted above, where a service engine (e.g., the load balancer) is keeping track of state information relating to sessions or connections locally, and is not sharing state information with other service engines of the cluster. For example, the service engine might wish to keep track of application specific information concerning the type of application the packet's payload concerns, or connection oriented information relating to the connection being established. Such state information may be necessary for performing certain tasks relating to processing packets, and/or may enable more sophisticated tasks to be performed on the packets by the service engine. In certain circumstances, therefore, directing packets to a same service engine that processed prior traffic relating to the data flow can be useful.

However, the addressing scheme used for clustered devices often does not provide for such targeted communications. This is because it can be desirable for a cluster to present itself as a single entity to outside entities or devices for purposes of network interactions. In such circumstances, a cluster may identify itself to other entities using virtual addresses which are associated with the cluster as a whole and which cannot be used to send communications to any of the cluster's constituent devices in particular.

Consequently, various particular embodiments described herein provide mechanisms for implementing clustering services in a manner that allows packets to be directed to particular service engines.

The techniques used to achieve this result can involve the use of a flow table controller associated with a group of devices (for example, servers) with which the clustered service engines (for example, load balancers) are in communication. The flow table controller may make an entry in a flow table identifying a data flow associated with a forward packet, that is, a packet received from a client. The flow table entry might include, for example, source IP address and port, and destination IP address and port, of the forward packet. The flow table controller may also insert a flow entry to be used with any reverse traffic associated with the data flow (e.g., where the server is sending traffic to the client), the entry identifying the MAC address of a service engine associated with the flow. Then, later, when the flow table controller receives a packet going in the reverse direction that is part of the same data flow, the flow table controller may map the packet to the relevant flow table entry, and replace the destination MAC address of the reverse packet with the MAC address for the service engine provided in the flow table entry.

Referring to FIG. 1, for context, an exemplary virtual data center according to an embodiment of the present invention is shown. The data center 100 includes a switch 130, a single load balancer 140, a Layer 2 switching fabric 150, and three servers S1-S3 160, 170 and 180.

As an example of the use of the data center depicted in FIG. 1, a client 110 might send a message through the Internet 120 to a switch 130. While a single switch is shown in FIG. 1 as the entry point of the data center, in other embodiments, the entry point to the data center might be configured as a virtual switch comprised of a plurality of physical switches, routers or other network devices. In such embodiments, a client might be given a virtual IP address of the virtual switch as the IP address to be used for accessing the data center.

In the data center shown in FIG. 1, the client 110 can be any type of client including but not limited to servers or personal computers running on the Unix, Windows™ or any other computing platform. Similarly, the switch 120 can be any type of switch such as those commercially available from Cisco Systems of San Jose, Calif., including Cisco's Catalyst® line of switches.

As shown in FIG. 1, the switch 130 is connected to a service engine, here depicted as a load balancer 140. The switch forwards the packet to the load balancer 140, and the load balancer 140 then selects a server from among a group of servers S1-S3 160, 170 and 180, to which to send the packet.

At a very high level, the load balancing might involve determining which of the servers is best able to service the message from the client. The load balancer 140 may take into account a number of factors in selecting the appropriate server. The analysis might involve a consideration of the type of payload carried by the packet and/or the actual content of the payload itself, the bandwidth on different links, and/or the availability of different servers.

After selecting a server, the load balancer 140 of FIG. 1 forwards the packet to the selected server, in this example, server 1 160, through a Layer 2 network 150. In the data center shown in FIG. 1, the servers S1-S3 can be any type of servers including but not limited to database servers and application servers. Further, the load balancer 140 can be any type of load balancer. For example, it might have some of the features of an application control engine (ACE) which provides mechanisms for accelerating application and server performance in a virtualized architecture by, among other things, providing intelligent load-balancing and content-switching. In other embodiments, the load balancer 140 might simply load balance packets across a group of servers 160, 170 and 180.

Further, in alternative embodiments, the service engine may not provide load balancing functionality at all. The service engine might be a device that functions as a firewall, for example.

Note in FIG. 1 the load balancer 440 is shown as an external device located outside the switch 130, and connected to the switch through network links. In other embodiments, the load balancer might be located inside the switch 130. Note also that while the load balancer depicted in FIG. 1 is depicted as an individual physical device, it could also be configured as a virtual load balancer comprised, for example, of an active load balancer and a backup load balancer.

Further, in some embodiments, the servers are separate physical servers. However, in other embodiments, the servers could be embodied as virtual machines corresponding to different blades of a single server appliance, for example, as in the Unified Computing System blade platform commercially available from Cisco Systems. In alternative implements, each virtual machines could be comprised of one or more physical devices.

In FIG. 1, a particular virtualized architecture for a data center is shown. However, it will be appreciated that the invention should not be construed to be limited to networks using such an architecture, and may be applied to various types of data centers.

Various embodiments of the present invention assure that a reverse (or response) packet sent by the selected server to a client be transmitted through the same service engine (for example, load balancer) that processed the corresponding forward packet from the client. In the embodiment of the invention shown in FIG. 1, this result can be accomplished by providing that the servers each use the load balancer 140 as the gateway device for all reverse traffic transmitted out of the Layer 2 150, that is, the traffic directed towards the client. For example, each of the plurality of servers might be configured to use the MAC address of the load balancer 140 as the destination gateway MAC address for any reverse packets.

Figure 2:
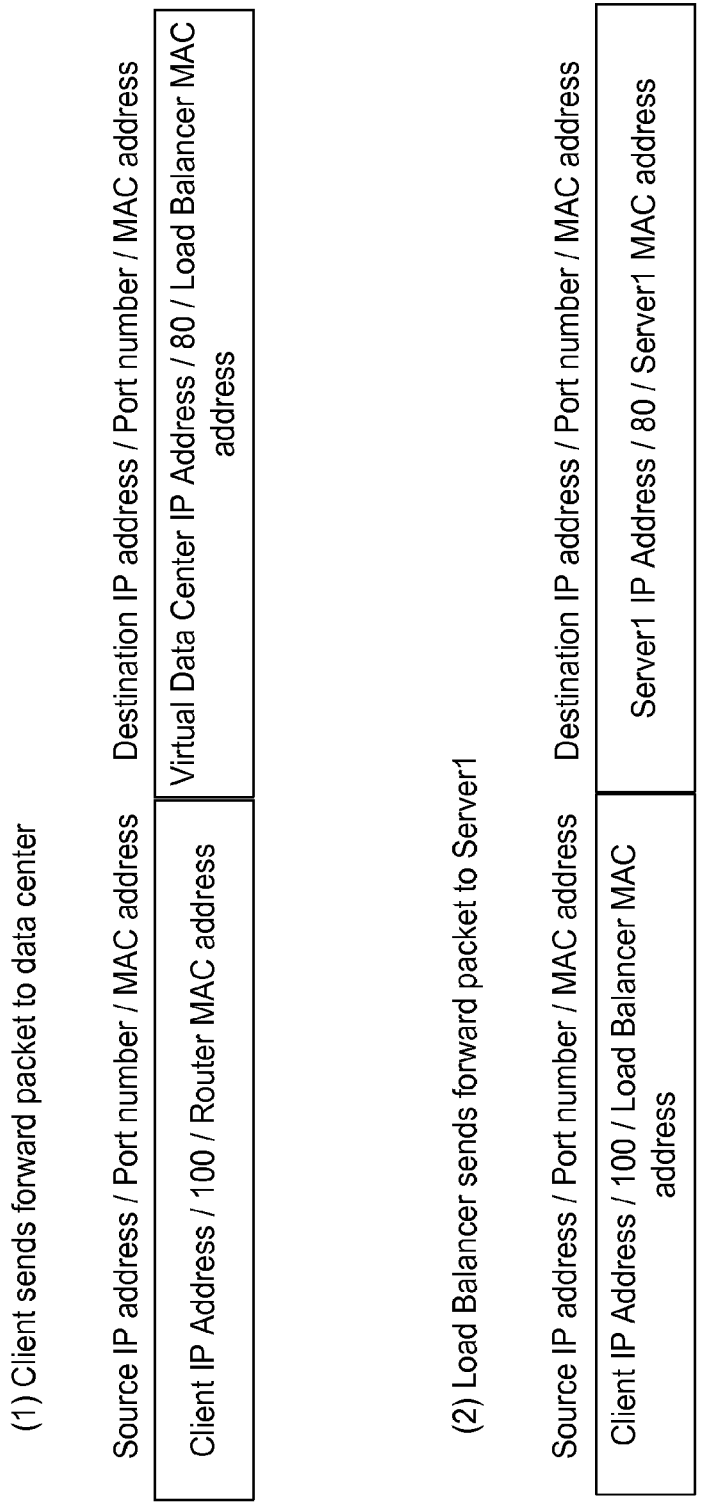
FIG. 2 illustrates a particular example of portions of packet headers that might be used in connection with the data center depicted in FIG. 1.

Relevant portions of packet headers that might be used in accordance with the embodiment of the invention depicted in FIG. 1 are shown in FIGS. 2 and 3. FIG. 2 shows possible header fields for a forward packet that might be sent from the client to switch 130, and then from the load balancer 140 to the selected switch S1. Specifically, version 1 of FIG. 2 shows the header fields that might be found in the header of a forward packet being sent from a client to a data center. Version 2 shows possible header fields of a packet being sent by a load balancer 140 to a selected server 160.

FIG. 3 shows possible header fields for a packet sent in the reverse direction. Version 3 of FIG. 3 show relevant portions of a header of a packet being sent by Server 1 180 to the load balancer 140, Version 4 shows relevant portions of a header of a packet being sent from the load balancer 140 to the client 110.

Note the particular IP addresses, MAC addresses, and port numbers used in FIGS. 2 and 3 are depicted for illustrative purposes only, and should not be construed to restrict the invention. For example, the source port number in the header fields 210 and 220 is depicted as 100 but it could be designated to be any available port number.

Further, note that while IP addresses and MAC addresses are depicted in FIGS. 2 and 3, the invention should not be construed to be limited to networks using a protocol, such as TCP/IP protocol, that employ IP and MAC addresses.

While the embodiment disclosed in FIG. 1 is effective for providing a virtual data center, in some situations, it may be desirable to have a cluster of service engines (e.g., load balancers) rather than a single service engine. Clustering can improve the scalability of a system, and can provide additional support for flexible and dynamic allocation of network resources, among other things. As noted above, a cluster represents multiple physical service engines as one logical service entity. A virtual data center using a cluster of two load balancers LB1-LB2 is shown in FIG. 4.

Figure 4:
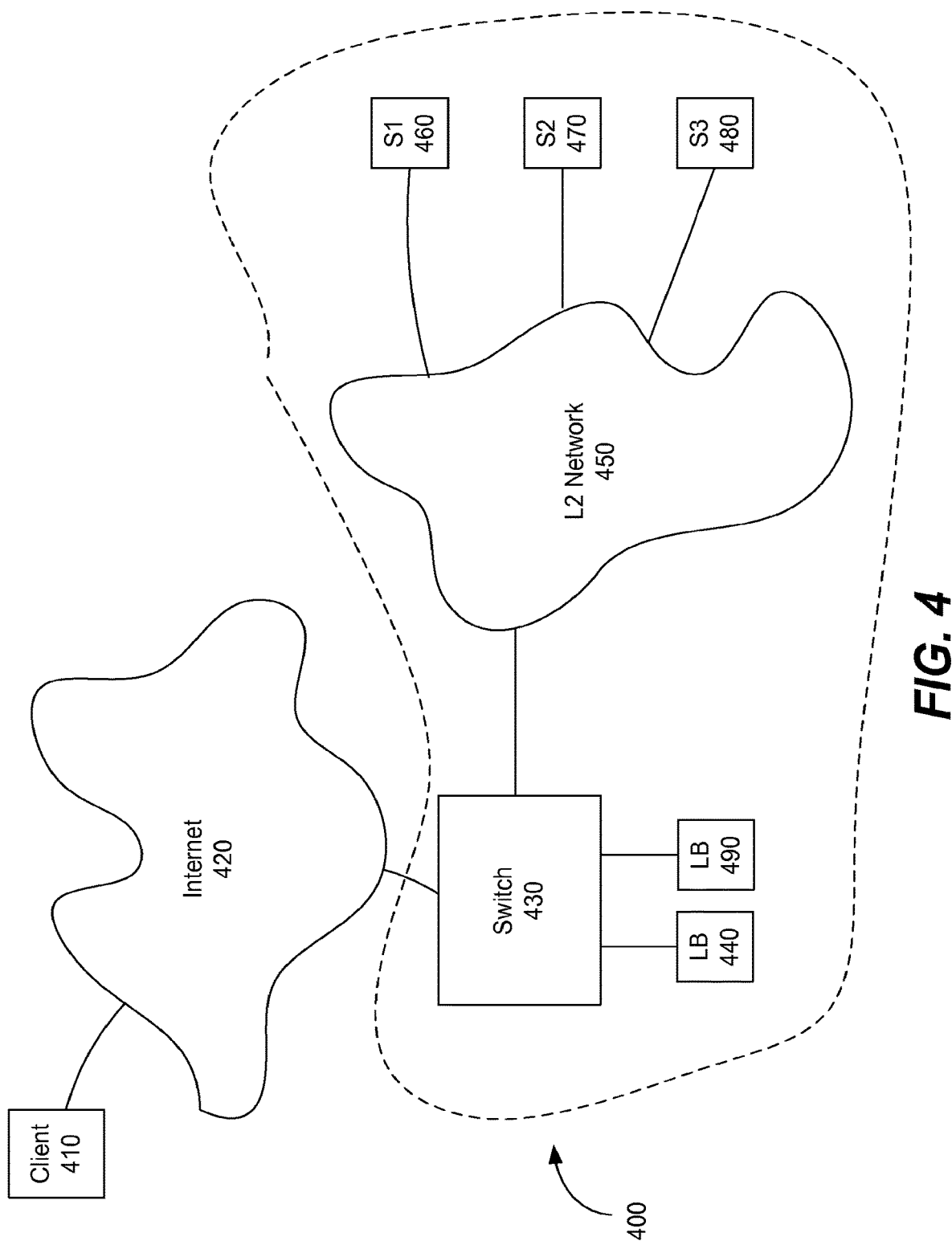
FIG. 4 illustrates a particular example of a data center using clustering services.

Note in FIG. 4, the entry point into the data center is depicted as a single switch 430 but it could also be configured as a group of switches, routers or other network devices. In the embodiment of the invention depicted in FIG. 4, switch 430 is also connected to two load balancing devices, LB1-LB2 440 and 490, which constitute a cluster. Note that in FIG. 4 the two load balancers 440 and 490 are shown as external devices connected to the switch 430 through links, but in other embodiments, the two load balancers 440 and 490 could be located inside the switch 430. In some embodiments, the load balancers might comprise application control engines (ACEs) commercially available from Cisco Systems In the data center shown in FIG. 4, the switch 430 performs a hash function upon receiving the packet to determine which load balancer from among the cluster of load balancers to assign to a packet. The switch 430 then sends the packet to the selected load balancer, for example, LB1 440. In alternative embodiments, the load balancer may be chosen based on the type of application or other content associated with the packet.

The selected load balancer 440 then itself performs load balancing to select a server from among the group of servers S1-S3 to process the packet, and then sends the packet to that server. In some embodiments, the load balancing performed by the load balancers LB1-LB2 might involve evaluating application specific content information associated with the packet to determine the selected server. For example, such a process might enable a virtual data center to provide specialization and efficiency by employing different servers designed or configured to perform particular tasks efficiently. For example, one type of server might be appropriate for handling traffic for a particular application (e.g., a video application) while another type of server might be better equipped to handle traffic for a different application. Packets and connections for video traffic would be directed to the first server and packets and connections for other traffic would be directed to a different server Note that while the load balancers depicted in FIG. 4 are depicted as individual physical devices, each load balancer could also be configured as a virtual load balancer comprised, for example, of an active load balancer and a backup load balancer. The same might apply to any type of service engine that might be used in place of load balancers in other embodiments of the invention.

Further, while the servers are represented in FIGS. 1 and 4 as separate physical devices, in some embodiments, the servers could be implemented as virtual machines. Such virtual machines could be implemented in different forms. For example, each of the virtual machines might be located on a separate blade of a single physical network appliance. In the alternative, each virtual machine might be implemented as an individual appliance, or as a cluster of a plurality of physical appliances.

Particular embodiments require no vendor specific solutions and apply to a variety of devices from different vendors.

After processing the forward packet, the selected server 460 may wish to transmit a reverse (or response) packet to the client 410. As noted above, in some embodiments, it may be desirable to have a selected server 460 send any reverse packets to the same service engine (for example, load balancer 440) that processed the forward traffic.

As discussed above, such a result may be desirable, for example, where a service engine is keeping track of session/connection states locally. Such state information might comprise connection-oriented information or application content specific information, among other things. As discussed above, where such state information is not being shared across service engines, it may be desirable to have all data traffic of a particular data flow pass through the same service engine in order to take advantage of such state information. In some embodiments where the state information includes connection related information, it is even possible that the connection with a client could be lost if a reverse packet were not directed to the same service engine that processed the forward packet.

As set forth above, the basic transmission process for a virtual data center, which uses a cluster of load balancers LB1-LB2, as depicted in FIG. 4 is similar at a high level to that which occurs in a virtual data center using a single load balancer, as depicted in FIG. 1. However, the task of assuring that reverse traffic passes through the same load balancer (service engine) which processed the corresponding forward traffic can be more challenging in the configuration depicted in FIG. 4.

Various embodiments seek to provide mechanisms for directing reverse traffic to the same service engine that handled the corresponding forward traffic in order to minimize the traffic disruptions that might occur when service engine clustering is employed in a virtual data center. Various embodiments of the present invention achieve this result in part by having the selected service engine include its own device MAC address, rather than the virtual MAC address for the cluster, as the source MAC address in any forward packet sent to the selected server.

Some example packet header fields that might be used in accordance with the invention depicted in FIG. 4 are shown in FIGS. 5 and 6.

The changes from the headers fields depicted in FIGS. 2 and 3 are highlighted for purposes of clarity. For example, the destination MAC address of the header 510 of the forward packet sent from the client to the virtual data center might be changed to replace the Load Balancer MAC address with a virtual Load Balancer MAC address. Further the source MAC address of the header 520 of the forward packet sent from the selected Load-Balancer 440 to the selected server, server 1 460, might be changed from Load Balancer MAC address to Load-Balancer MAC address. Similarly, the destination MAC address of the header 610 of the reverse packet sent from the server 1 to the cluster of load balancers might be changed from the Load Balancer MAC address to Virtual Load-Balancer MAC address. Further the source MAC address of the header 620 of the reverse packet sent from the selected Load-Balancer 440 to the client 410 might be changed from Load Balancer MAC address to the virtual Load Balancer MAC address.

Further, an additional set of header fields, referenced as version (4) in FIG. 6, shows the changes that may be made, in various embodiments, to the destination MAC address of a reverse packet by a flow table controller located on the data path between the group of servers and the cluster of load balancers. The functions performed by the flow table controller (including those depicted in version (4) of FIG. 6) are described in more depth below in connection with the discussion of FIGS. 7 and 8.

Servers S1-S3 may be configured to use a particular default gateway MAC address as the MAC address for all packets the servers transmit to devices beyond the L2 network connecting them to other devices. In the network configuration shown in FIG. 4, for example, the default gateway MAC address might be the virtual MAC address for the load balancing cluster comprised of load balancers LB1-LB2. Where the servers S1-S3 are so configured, the inclusion of a selected service engine's MAC address as a source address of a packet may not be sufficient to assure that a reverse packet is directed to the desired service engine because a server 51 may not have the capability to use a different MAC address than the default gateway MAC address. That is, a server 51 may simply disregard a source MAC address of a forward packet in preparing a header for a reverse packet because the server 51 may be configured to always use a designated default MAC address as the destination MAC address for any reverse packets.

Accordingly, in various embodiments, mechanisms are provided for assuring that a reverse packet is sent to a service engine associated with the data flow by using a flow table controller located on the data path between the cluster of service entries (e.g., load balancers LB1-LB2) and the group of virtual machines (e.g., servers S1-S3).

In embodiments where the servers are embodied as virtual machines, and each virtual machine corresponds to a blade of a single physical server appliance, such a flow table controller might be implemented as a "hypervisor" associated with the server appliance. A hypervisor can function as an interface between software environments and physical hardware that virtualizes a physical system's hardware. For example, a hypervisor might allow multiple operating systems to run on a host computer concurrently, or permit the creation of multiple virtual machines on the same physical appliance.

In other embodiments, the flow table controller may be located in another module of a virtual data center, as long as the module is one through which a packet must pass both as a forward packet in a forward transmission path, and a reverse packet in a reverse transmission path, when being transmitted between the load balancer LB 1 and the selected server $S^1$.

In some embodiments, the data flow controller can be implemented by a software module. In other embodiments, the date flow controller can be implemented in hardware associated with the servers S1-S3. In the virtual data center 400 shown in FIG. 4, for example, the flow table controller might be located in a hypervisor or a Sereno ASIC of a Unified Computing System commercially available from Cisco Systems, Inc.

Figure 7:
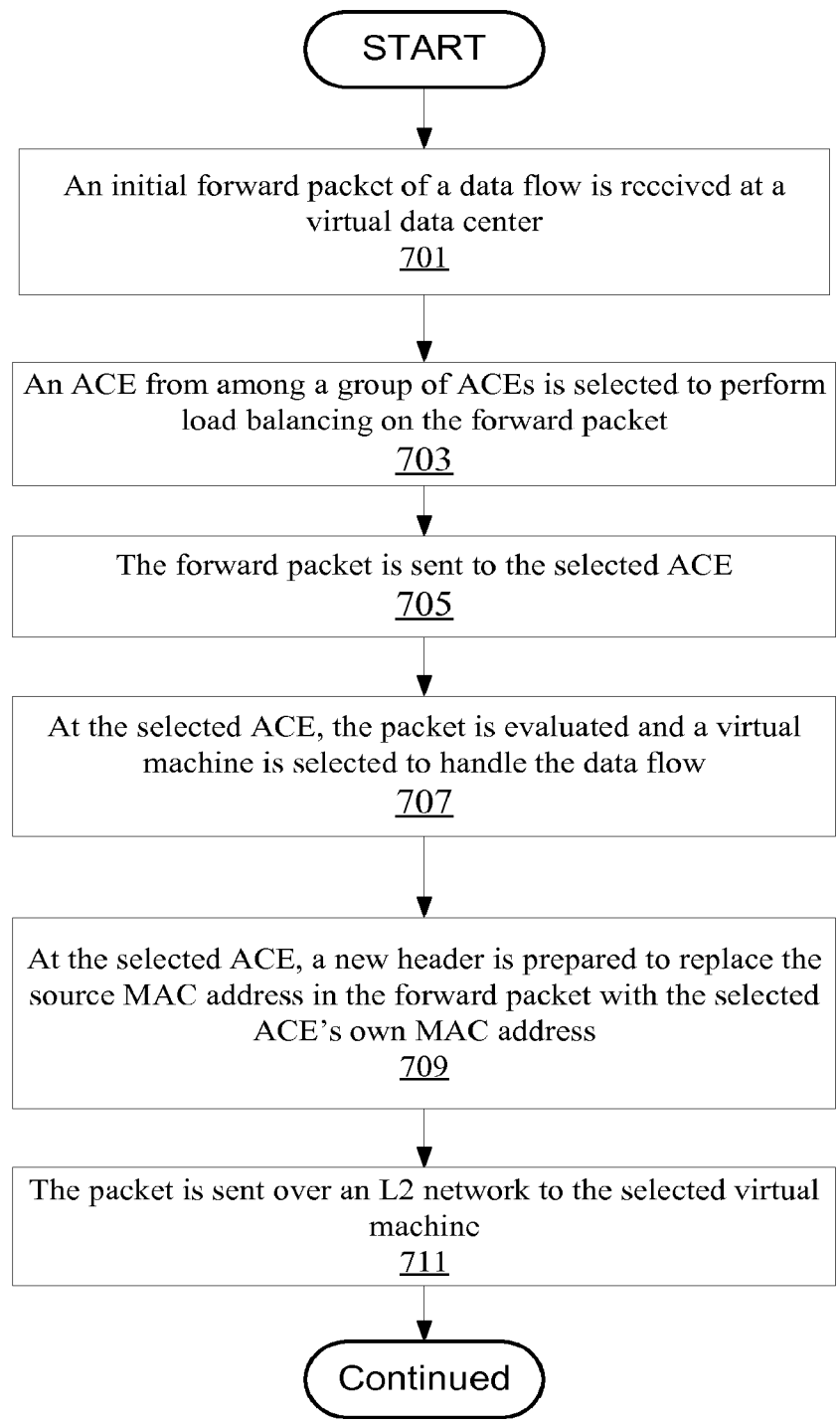
FIG. 7 illustrates a particular example of a technique for facilitating data center clustering services.
Figure 7:
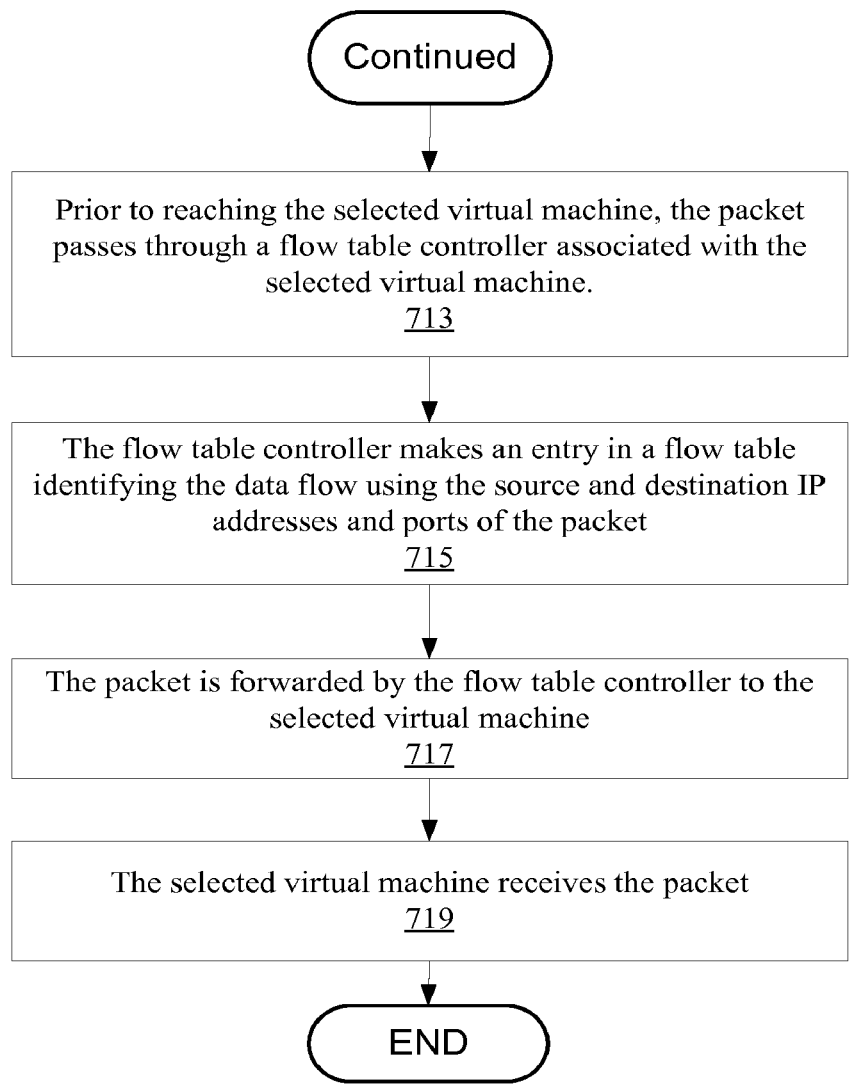

A high level flow diagram showing a process for sending a forward packet in accordance with an embodiment of the invention is shown in FIG. 7.

As shown, the process begins at a block 701 where an initial forward packet of a data flow is received from a client at a virtual data center associated with a virtual IP destination address.

Next, at a block 703, the source IP address, the destination IP address, the source port, and the destination port are evaluated and a load balancer from among a group of load balancers that comprise a load balancing cluster is selected to perform load balancing for the forward packet.

As shown in a block 705, the process then sends the forward packet to the selected load balancer. The load balancer performs various load balancing and possibly other functions on the packet.

Next, at a block 707, at the selected load balancer, the packet is evaluated to determine information about the data carried by the packet, and a virtual machine is selected to handle the new data flow.

Then, at a block 709, at the selected load balancer, the process prepares a new header replacing the source MAC address in the forward packet with the selected load balancer's own MAC address. The selected load balancer may also replace the destination IP and MAC addresses for the forward packet with the IP and MAC addresses for the selected virtual machine.

Next, at a block 711, the packet is sent over an L2 network to the selected virtual machine.

Prior to reaching server 1, next, at a block 713, the packet passes through a flow table controller associated with the selected virtual machine. The flow table controller might be configured as a module of a hypervisor. The flow table controller is responsible for performing various management functions relating to data flows.

A flow table might be used to perform a variety of functions, including assisting a system administrator to keep track of the amount of traffic on different flows, the last time a packet was sent on a particular flow, or other items that might be of interest in maintaining a network.

At a block 715, the flow table controller makes an entry in a flow table identifying the data flow, for example, by using the source IP address and port, and the destination IP address and port, identified in the packet. The flow table controller also includes the MAC address of the selected load balancer, in the flow table entry, the MAC address to be used as the destination MAC address for any reverse traffic. Example flow table entries are provided in FIG. 9.

Then, at a block 717, the packet is forwarded by the flow table controller to the selected virtual machine.

Finally, at a block 719, the selected virtual machine receives the packet.

Figure 8:
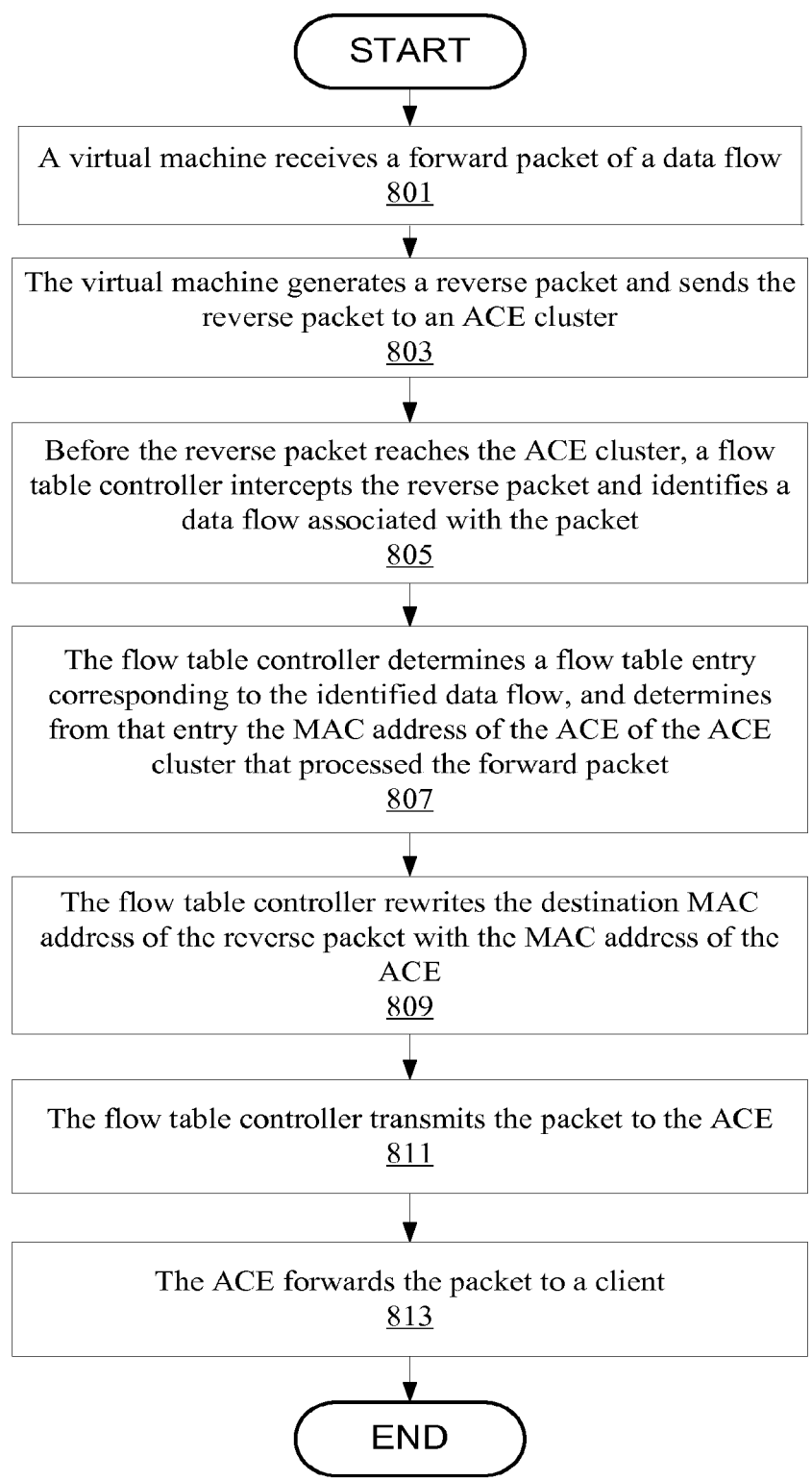
FIG. 8 illustrates a particular example of a technique for facilitating data center clustering services.

As noted above, when a selected virtual machine sends a reverse packet, it can be desirable to have such reverse packet processed by the same service engine that processed the corresponding forward packet. FIG. 8 shows at a high-level the process for directing reverse traffic to the proper service engine.

As shown, the process begins at a block 801 where a virtual machine receives a forward packet of a data flow.

Next, at a block 803, the virtual machine generates a reverse packet and sends the reverse packet to a load balancing cluster. Assuming that the load balancing cluster has been designated as the default gateway for the virtual machine, the virtual machine may identify the virtual MAC address for the load balancing cluster as the destination MAC address.

As shown in a block 805, before the reverse packet reaches the cluster of load balancers, a flow table controller intercepts the reverse packet and identifies a data flow associated with the packet based on source and destination IP addresses and ports of the packet.

Next, at a block 807, the flow table controller determines a flow entry in the flow table corresponding to the identified data flow, and determines from that entry the MAC address of the load balancer of the load balancing cluster that processed the forward packet.

Then, at a block 809, the flow table controller rewrites the destination MAC address of the reverse packet with the MAC address of the load balancer.

Next, at a block 811, the flow table controller transmits the packet to the load balancer Then, at a block 813, the load balancer forwards the packet to a client.

The embodiments described in FIGS. 7 and 8 might be implemented on a virtual data center such as that described in FIGS. 4 through 6. However, note that in the embodiments of the invention described in FIGS. 7 and 8, the servers S1-S3 are implemented as virtual machines.

Figure 9:
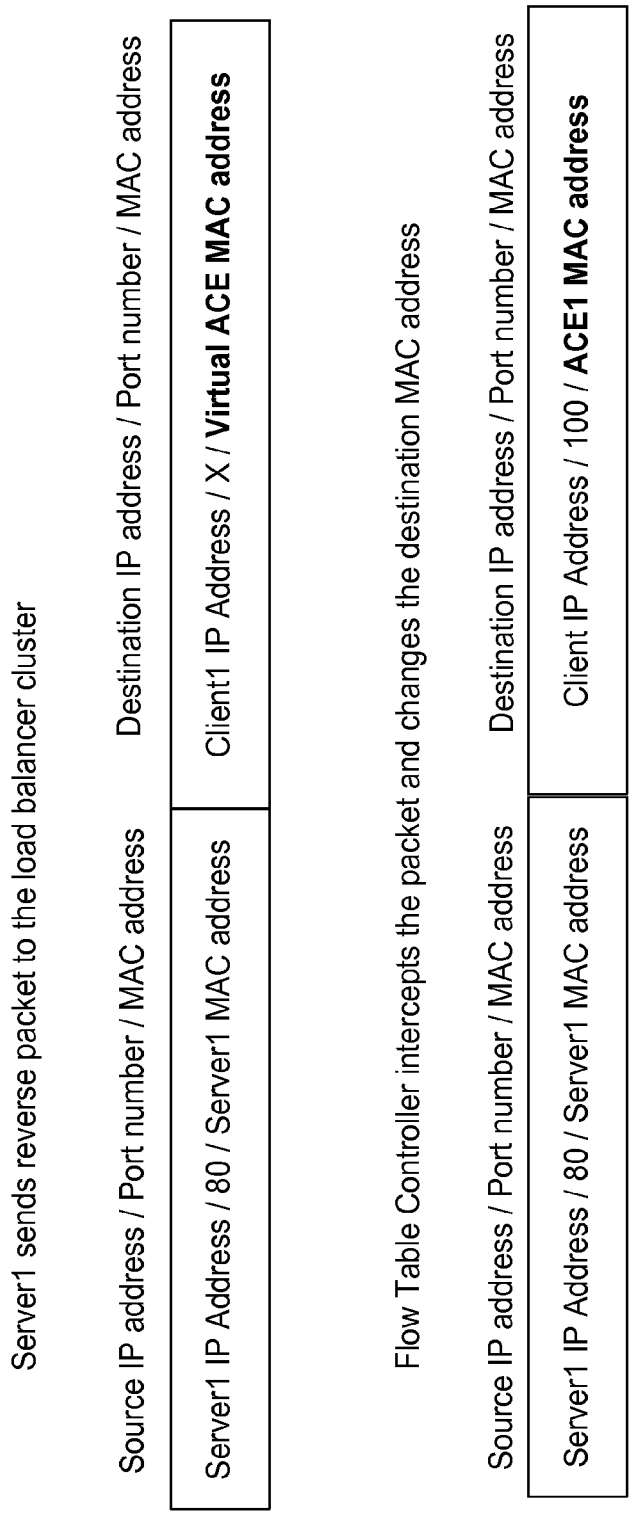
FIG. 9 illustrates example flow table entries that might be created in accordance with the embodiment of the invention depicted in FIG. 4.

FIG. 9 shows example portions of flow table entries 940, 950, 960 for a data flow according to an embodiment of the invention.

FIG. 9 also shows relevant header information 910, 920, 930 for a forward packet that might correspond to the depicted flow table entries. For example, a forward packet might designate the following six tuple information 910:

Source IP address: Client 1 IP address
Source port: X
Source MAC address: Load-Balancer 1 MAC address
Destination IP address: Server 1 IP address
Destination port: 80
Destination MAC address: Server 1 MAC address Using this information, the flow table controller might create the following flow table entry 940 for the associated data flow:

If from Server1 IP/80 to Client1 IP/X→Change destination MAC address to Load-Balancer1 MAC address FIG. 9 also shows an example of packet header fields of a reverse packet as they might appear before and after a reverse packet associated with the above described data flow was processed by a flow table controller. As indicated in FIG. 9, Server 1 can create a reverse packet with the destination MAC address of its default gateway, which is a generic MAC address for a collection of load balancers that function as a gateway. As described above, in one embodiment, Server 1 can send the reverse packet to the load balancing cluster. The flow table controller can intercept the reverse packet before it reaches the load balancing cluster. The flow table controller can then determine a flow entry in a flow table that corresponds to the reverse packet based on the source and destination IP addresses and ports of the reverse packet. It can then determine from the flow table entry the MAC address of the load balancer associated with the reverse packet's data flow. The flow table controller can swap out the generic MAC address for that of the load balancer that processed the corresponding forward traffic. It can do this by rewriting the destination MAC address of the reverse packet, as shown in the example depicted in FIG. 9.

An example of the changes made by a flow table controller to the destination MAC address of a reverse packet are also illustrated in version (4) of the packet header fields shown in FIG. 6.

Figure 10:
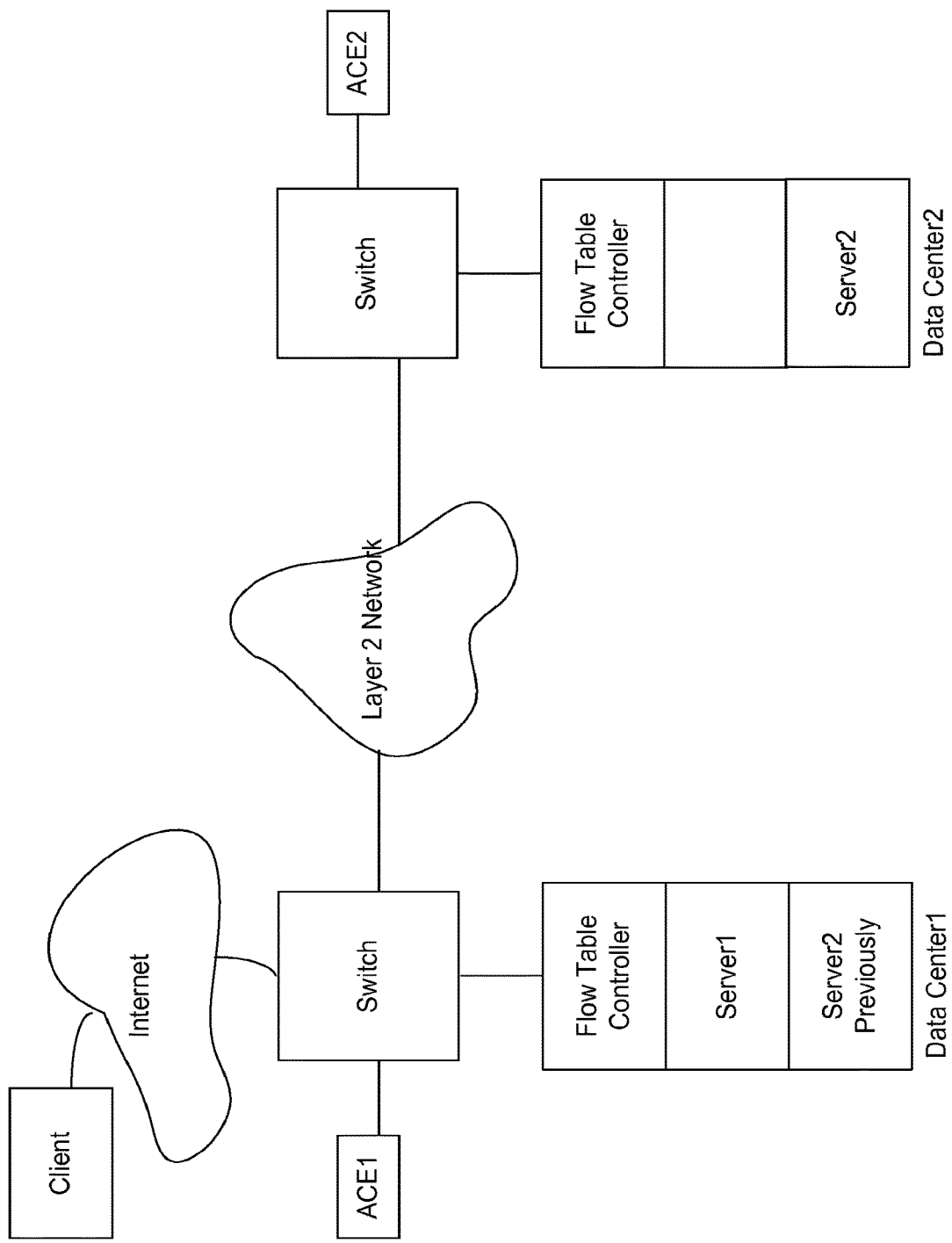
FIG. 10 illustrates a particular example of a system in which a first data center is connected to a second data center.

Another embodiment of a virtual date center is shown in FIG. 10. This embodiment involves two separate data centers linked together by a Layer 2 network, for example, to extend the power and storage capacity of the virtual data center. The Layer 2 network may be a third party network or a private network and may be described as an inter-cloud.

The virtual data center shown in FIG. 10 might be useful in circumstances where a server is moved from a first data center to a second data center, or, in the alternative, where a load balancing cluster is configured to distribute packets across servers in two different data centers to begin with. Such distributed data centers can make all servers in a system available to all load balancers in the system regardless of the physical location of the servers or load balancers thus expanding the resources available to clients accessing the system.

Linking a first data center 1010 to a second data center 1020 raises the challenge of assuring that reverse traffic from a selected server in the second data center can be directed back through the same service engine that processed the corresponding forward traffic, even if that service engine is located in the first data center. According to various embodiments of the present invention, a flow table controller located in the second data center can be used to redirect any reverse traffic from a server in the second data center to a service engine in a first data center using techniques similar to those used by a flow table controller in the embodiment of the invention described in FIGS. 7 and 8.

In the embodiment of a virtual data center comprising two physical data centers depicted in FIG. 10, a packet can be directed to a particular service engine by having a flow table controller associated with a second data center store an entry in a flow table, the flow table entry including the MAC address of a selected service engine that processed a forward packet as well as information identifying a data flow associated with the forward packet. Then, when the flow table controller receives a reverse packet of the same data flow, it can identify the corresponding flow table entry from the flow table. Then, the flow table controller can rewrite the destination MAC address for the reverse packet with the selected service engine's MAC address, as identified in the flow table entry.

Although illustrative embodiments and applications of this invention are shown and described herein, many variations and modifications are possible which remain within the concept, scope, and spirit of the invention, and these variations would become clear to those of ordinary skill in the art after perusal of this application. For instance, as noted above, the present invention is described as being applied to packets. However, it should be understood that the invention is not limited to such implementations, but instead would apply to frames as well. Moreover, the present invention would apply regardless of the context and system in which it is implemented.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus of this invention may be specially constructed for the required purposes, or may be a general-purpose programmable machine selectively activated or reconfigured by a computer program stored in memory. The processes presented herein are not inherently related to any particular switch, server or other apparatus. In a preferred embodiment, any of the switches or routers that may be used in this invention may be specially configured network devices available from Cisco Systems, Inc. of San Jose, Calif., including the Catalyst family of switches manufactured by Cisco. Further, any of the servers of this invention may be specially configured server appliances available from Cisco Systems, Inc. of San Jose, Calif., including the Unified Computing System manufactured by Cisco. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid of this invention may be implemented on a general-purpose programmable machine selectively activated or reconfigured by a computer program stored in memory. Such programmable machine may be a network device designed to handle network traffic.

Such network devices typically have multiple network interfaces including frame relay, ISDN, and wireless interfaces, for example. Specific examples of such network devices include routers, switches and other network devices, including devices designed for virtual architectures. A general architecture for some of these machines will appear from the description given below. Further, the invention may be at least partially implemented on a card (e.g., an interface card) for a network device or a general-purpose computing device.

Referring now to FIG. 11, a router or switch 1110 suitable for implementing the switch described in the present invention includes a master central processing unit (CPU) 1120, interfaces 1130, and a bus 1150 (e.g., a PCI bus). When acting under the control of appropriate software or firmware, the CPU 1120 is responsible for such router tasks as routing table computations and network management, as well as layer 2 and/or layer 3 tables including layer 2 and layer 3 information, respectively. It may also be responsible for updating various tables etc. It preferably accomplishes all these functions under the control of software including an operating system (e.g., the Nexus Operating System of Cisco Systems, Inc.) and any appropriate applications software. CPU 1120 may include one or more processors 1124 such as a processor from the Motorola family of microprocessors or the MIPS family of microprocessors. In an alternative embodiment, processor 1124 is specially designed hardware for controlling the operations of router 1110. In a specific embodiment, a memory 1122 (such as non-volatile RAM and/or ROM) also forms part of CPU 1120. However, there are many different ways in which memory could be coupled to the system.

The interfaces 1130 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, Fibre Channel interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1124 to efficiently perform routing computations, network diagnostics, security functions, etc.

Although the system shown in FIG. 11 is one specific network device (e.g., router or switch) of the present invention, it is by no means the only switch or router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules directly associated with the CPU (including memory 1122) and/or one or more separate memories or memory modules outside of the CPU (including memory 1140) configured to store program instructions for the general-purpose network operations and mechanisms for the functions described herein. The program instructions may control the operation of an operating system and/or one or more applications, for example. The memory or memories may also be configured to store tables such as layer 2 and layer 3 tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

In addition, although an example network device is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein.

What is claimed is:

1. A method comprising:
   receiving, at a controller, a forward packet from a selected service engine of a group of service engines, the forward packet originating from a client;
   creating, by the controller, an entry in a table for indicating a data flow associated with the forward packet, the entry including an identifier of the selected service engine;
   sending, by the controller, the forward packet to a selected server of a group of servers;
   receiving, at the controller, a reverse packet from the selected server, the reverse packet including an identifier of the group of service engines and destined for the client;
   modifying, by the controller, the reverse packet using the entry in the table by replacing the identifier of the group of service engines with the identifier of the selected service engine; and
   sending, by the controller, the modified reverse packet to the selected service engine,
   wherein the controller is disposed on a data path between the group of service engines and the group of servers.

2. The method of claim 1, further comprising:
   identifying, by the controller, the identifier of the selected service engine from the entry in the table to apply to the reverse packet.

3. The method of claim 1, further comprising:
   identifying, by the controller, a data flow associated with the reverse packet based on one or more identifiers included in the reverse packet;
   verifying, by the controller, a correspondence between the data flow associated with the reverse packet and the data flow associated with the forward packet indicated by the entry in the table; and upon verifying the correspondence, determining, by the controller, the identifier of the selected service engine using the entry in the table.

4. The method of claim 1, wherein the group of service engines comprises a cluster of load balancers of a virtual data center.

5. The method of claim 1, wherein the group of service engines comprises a plurality of physical devices configured as a single logical entity.

6. The method of claim 1, wherein the group of servers comprises a group of virtual machines.

7. The method of claim 1, wherein the identifier of the group of service engines comprises a default gateway address directed to the group of service engines.

8. The method of claim 1, wherein the controller comprises a hypervisor.

9. The method of claim 1, wherein sending the forward packet to the selected server comprises sending the forward packet to the selected server over a layer-2 (L2) network.

10. The method of claim 1, wherein the identifier of the group of service engines and the identifier of the selected service engine comprise MAC addresses.

11. A controller comprising:
one or more processors;
a non-transitory memory for storing program instructions;
the one or more processors being configured to execute the program instructions for:
receiving a forward packet from a selected service engine of a group of service engines, the forward packet originating from a client;
creating an entry in a table for indicating a data flow associated with the forward packet, the entry including an identifier of the selected service engine;
sending the forward packet to a selected server of a group of servers;
receiving a reverse packet from the selected server, the reverse packet including an identifier of the group of service engines and destined for the client;
modifying the reverse packet using the entry in the table by replacing the identifier of the group of service engines with the identifier of the selected service engine; and
sending the modified reverse packet to the selected service engine,
wherein the controller is disposed on a data path between the group of service engines and the group of servers.

12. The controller of claim 11, wherein the one or more processors are further configured to execute the instructions for:
identifying, from the entry in the table, the identifier of the selected service engine to apply to the reverse packet.

13. The controller of claim 11, wherein the controller comprises a hypervisor.

14. The controller of claim 11, wherein the group of service engines comprises a cluster of load balancers.

15. The controller of claim 11, wherein the group of servers comprises a group of virtual machines.

16. The controller of claim 11, wherein the identifier of the group of service engines comprises a default gateway address directed to the group of service engines.

17. A non-transitory computer-readable storage medium storing thereon computer-readable instructions which are executable by one or more processors of a controller, the computer-readable instructions comprising:
instructions for receiving a forward packet from a selected service engine of a group of service engines, the forward packet originating from a client;
instructions for creating an entry in a table for indicating a data flow associated with the forward packet, the entry including an identifier of the selected service engine;
instructions for sending the forward packet to a selected server of a group of servers;
instructions for receiving a reverse packet from the selected server, the reverse packet including an identifier of the group of service engines and destined for the client;
instructions for modifying the reverse packet using the entry in the table by replacing the identifier of the group of service engines with the identifier of the selected service engine; and
instructions for sending the modified reverse packet to the selected service engine,
wherein the controller is disposed on a data path between the group of service engines and the group of servers.

18. The non-transitory computer-readable storage medium of claim 17 having computer-readable instructions further comprising:
instructions for identifying, from the entry in the table, the identifier of the selected service engine to apply to the reverse packet.

19. The non-transitory computer-readable storage medium of claim 17, wherein the identifier of the group of service engines comprises a default gateway address directed to the group of service engines.

20. The non-transitory computer-readable storage medium of claim 17, wherein the group of service engines comprise a cluster of load balancers of a data center, and wherein the group of servers comprises a group of virtual machines.

* * * * *